US00RE38739E

(19) United States
(12) Reissued Patent
Miura

(10) Patent Number: US RE38,739 E
(45) **Date of Reissued Patent: *May 31, 2005**

(54) FACSIMILE APPARATUS

(75) Inventor: Shigeo Miura, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

This patent is subject to a terminal disclaimer.

(21) Appl. No.: 09/061,235

(22) Filed: Apr. 16, 1998

Related U.S. Patent Documents

Reissue of:
(64) Patent No.: 5,509,072
Issued: Apr. 16, 1996
Appl. No.: 08/419,259
Filed: Apr. 10, 1995

U.S. Applications:

(62) Division of application No. 08/137,227, filed on Oct. 18, 1993, now Pat. No. 5,430,800, which is a continuation of application No. 07/652,060, filed on Feb. 7, 1991, now abandoned.

(30) Foreign Application Priority Data

Feb. 8, 1990 (JP) ..... 2-027059

(51) Int. Cl.[7] ..... H04N 1/44
(52) U.S. Cl. ..... 380/243; 380/244; 380/245; 380/246; 380/255; 380/266
(58) Field of Search ..... 380/9, 10, 18, 380/20, 49, 243, 244, 245, 246, 255, 266

(56) References Cited

U.S. PATENT DOCUMENTS 3,715,478 A * 2/1973 Vasseur ..... 380/18
4,091,423 A * 5/1978 Branscome ..... 380/18
4,484,025 A * 11/1984 Ostermann et al. ..... 380/21

(Continued)

FOREIGN PATENT DOCUMENTS

| | | |
|---|---|---|
| JP | 59221167 | 12/1984 |
| JP | 59-223076 | 12/1984 |
| JP | 63-248280 | 10/1988 |
| JP | 1-189246 | 7/1989 |

OTHER PUBLICATIONS

Diffie, W. and Hellman, M., "New Directions in Cryptography" IEEE Trans. Info. Theory vol. IT–22, No. 6; (Nov. 1976).*

(Continued)

*Primary Examiner*—Ayaz Sheikh
*Assistant Examiner*—James Seal
(74) *Attorney, Agent, or Firm*—Fitzpatrick, Cella, Harper & Scinto

(57) ABSTRACT

A facsimile apparatus is provided with changeover means that makes it possible to pass signals through or to bypass a coder, which encrypts transmission information, and a decoder, which decodes encrypted information that has been received. Whether or not a facsimile apparatus belonging to another party has an encrypting/decoding processing function is verified by a pre-procedure signal. If the other party's apparatus possesses an encrypting/decoding processing function, control is performed in such a manner that encrypting/decoding processing is applied solely to an image signal and a training-check signal transmitted before transmission/reception of the image signal, and encrypting/decoding processing is not applied to a procedure signal which accompanies [transmission reception] *transmission/reception* of the image signal. If the other party's apparatus does not possess an encrypting/decoding processing function, it is possible to select between terminating communication and performing facsimile communication without executing encrypting/decoding processing.

6 Claims, 8 Drawing Sheets

U.S. PATENT DOCUMENTS

| | | | | | |
|---|---|---|---|---|---|
| 4,558,369 | A | * | 12/1985 | Shinohara et al. | 380/18 |
| 4,985,919 | A | * | 1/1991 | Naruse et al. | 380/18 |
| 5,001,750 | A | * | 3/1991 | Kato et al. | 380/18 |
| 5,430,800 | A | * | 7/1995 | Miura | 380/18 |

OTHER PUBLICATIONS

Diffie et al. "Privacy and Authentification: An Introduction to Cryptography" Proceedings of the IEEE vol. 67, No. 3 (Mar. 1979).*

Shannon, C. E. "Communication Theory of Secrecy System", Bell Systems Tech. Journal No. 28 (Oct. 1949).*

"An Overview of the Public key cryptography", IEEE Communications Society Magazine, COM–16, 6 (Nov. 1978).

* cited by examiner

FACSIMILE APPARATUS

Matter enclosed in heavy brackets [ ] appears in the original patent but forms no part of this reissue specification; matter printed in italics indicates the additions made by reissue.

This application is a *reissue of U.S. Pat. No. 5,509,072, which issued from application Ser. No. 08/419,259, which is* a division of application Ser. No. 08/137,227 filed Oct. 18, 1993, now U.S. Pat. No. 5,430,800, which is a continuation of application Ser. No. 07/652,060 filed Feb. 7, 1991, now abandoned.

BACKGROUND OF THE INVENTION

This invention relates to a facsimile apparatus capable of subjecting facsimile communication information to cryptographic processing.

Conventional facsimile communication is carried out by a transmission control procedure in accordance with CCITT advisory T.30, and a major characteristic thereof is that a facsimile apparatus is capable of communicating with an unspecified large number of other facsimile apparatus via a public telephone transmission network.

For specific users, such as governmental offices and banks, it is required that the contents or facsimile communications be kept confidential because [or] *of* the nature of the work carried out.

In order to maintain the confidentiality of a communication, the conventional practice for such users is to connect an encrypting device to the facsimile apparatus. Such a device encrypts the contents of a communication before transmission in order to prevent the leakage of information if the apparatus is inadvertently connected to a facsimile apparatus other than that intended, as by dialing in the wrong number, or if the telephone line of the apparatus is wire-tapped.

A facsimile apparatus capable of such encrypted communication according to the prior art will now be described with reference to FIG. 5.

The facsimile apparatus having the construction shown in FIG. 5 will be described taking as an example a case where the apparatus sends image information to another facsimile apparatus 60 via a transmission line 51, a public telephone transmission network 50 and a transmission line 52 in accordance with an input from a control panel 14.

A conventional facsimile apparatus of this type transmits all communication information following encryption.

In operation, an encrypted control signal, which has been transmitted at a transmission rate of, say, 300 bps from the other facsimile apparatus 60, which is the facsimile apparatus on the receiving side, via the transmission line 52, public telephone transmission network 50 and transmission line 51, is sent to a demodulating circuit 8 from an NCU 6. The control signal demodulated by the demodulating circuit 8 enters a decoder 17-b, where the encrypted data is restored to the original data that is then transmitted to a received-data control circuit 9. The control signal that has been restored to the original data is deframed by the received-data control circuit 9, after which the resulting data is analyzed by a control-signal analyzer 10. The output of the analyzer 10 is sent to a flow controller 11, which administers overall control of the facsimile apparatus in accordance with a control procedure stored in a ROM 12.

In accordance with the control signal analyzed by the control-signal analyzer 10, the flow controller 11 causes a control-signal generator 2 to generate a corresponding control signal to be sent to the receiving side. The control signal generated by the control-signal generator 2 is directed through a changeover circuit 3 and sent to a transmission-data control circuit 4, where the control signal is subjected to framing processing. Thereafter, the output of the control circuit 4 is sent to a coder 17-a, where prescribed encryption processing is executed. The encrypted information is modulated by a modulating circuit 5 and is then transmitted to the other facsimile apparatus 60 on the receiving side via the NCU 6.

When such pre-processing has thus been executed prior to transmission of an image signal, the image signal, which is read by a reader 1 (or an image signal that has already been stored in a RAM 13), is obtained from the changeover circuit 3 and is then encrypted by the coder 17-a and transmitted to the other facsimile apparatus 60 in accordance with a route similar to that of the control signal described above.

On the receiving side, the received image signal is sent from the NCU 6 to the demodulating circuit 8. After the received image signal is demodulated by the demodulating circuit 8, the encrypted data are restored to the original data by the decoder 17-b, and these data are sent to the received-data control circuit 9. The received image signal is subsequently sent to the recorder 15, where the signal is printed out on recording paper or the like.

Thus, in the prior art, all of the communication data are encrypted, and facsimile communication is performed solely by the encrypted data.

However, in the example of the prior art described above, the following problems are encountered since the encrypting device which maintains the confidentiality of a communication is permanently connected to the facsimile apparatus:

(1) In a case where a call is established between the facsimile apparatus and one to which an encrypting device is not connected, one of the apparatus is entirely incapable of understanding the contents of a communication, the communication cannot be performed normally and operation ends in an error, regardless of whether the operation is transmission or reception. Moreover, when such a situation arises, the operator cannot tell why the operation ended in an error.

(2) In order to perform communication with a facsimile apparatus to which an encrypting device is not connected, the operator must search for another facsimile apparatus not having an encrypting device connected thereto or must open the cover of the original facsimile apparatus, detach the cable of the encrypting device and connect a bypass cable in its place. This is a very troublesome operation, especially when it must be repeated often.

(3) Since all control signals are also encrypted, encrypting of procedure signals takes [extras] *extra* time, and therefore an exorbitant amount of time is needed to determine whether communication is possible with another party's facsimile apparatus.

SUMMARY OF THE INVENTION

Accordingly, an object of the present invention is to provide a facsimile apparatus in which transmission of an encrypted signal to a receiving facsimile apparatus not equipped with an encryption function is prevented, thereby preventing erroneous operation of the receiving facsimile apparatus and transmission of an encrypted signal to an individual on a telephone by incorrect dialing.

Another object of the present invention is to provide a facsimile apparatus in which it is possible to determine why a communication ended in an error, even with regard to a telephone call made by incorrect dialing.

A further object of the present invention is to provide a facsimile apparatus in which additional time required by encrypting of procedure signals can be eliminated, thereby making it possible to rapidly determine whether communication is possible.

According to the present invention, the foregoing objects are attained by providing a facsimile apparatus capable of subjecting facsimile communication information to encryption processing, comprising encryption control means for executing control in such a manner that encryption processing is applied solely to an image signal and training-check signal transmitted before the image signal is transmitted/received, and the encryption processing is not applied to a procedure signal which accompanies transmission/reception to the image signal.

The facsimile apparatus further comprises encryption halting means for allowing communication of the image signal and the training-check signal without performing encryption processing, in a case where a facsimile apparatus on the receiving side does not possess an encrypting function, in response to a control signal from the facsimile apparatus on the receiving side when a transmission is made in facsimile communication.

Alternatively, the facsimile apparatus further comprises transmission suspending means for suspending a transmission operation, in a case where a facsimile apparatus on the receiving side does not possess an encrypting function, in response to a control signal from the facsimile apparatus on the receiving side when a transmission is made in facsimile communication.

In the arrangement described above, encryption processing is not applied to procedure signals, and only a training-check signal and image signal are encrypted. As a result, additional time required by encrypting of procedure signals can be eliminated, thereby making it possible to determine more rapidly whether communication is possible. In addition, by preventing transmission of an encrypted signal to a facsimile apparatus not possessing an encryption function, erroneous operation of the receiving facsimile apparatus can be avoided and transmission of an encrypted signal to a speaker on a telephone by incorrect dialing can be prevented.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

An embodiment of the present invention will now be described in detail with reference to the accompanying drawings.

<Description of the Apparatus (FIG. 1)>

Figure 1:
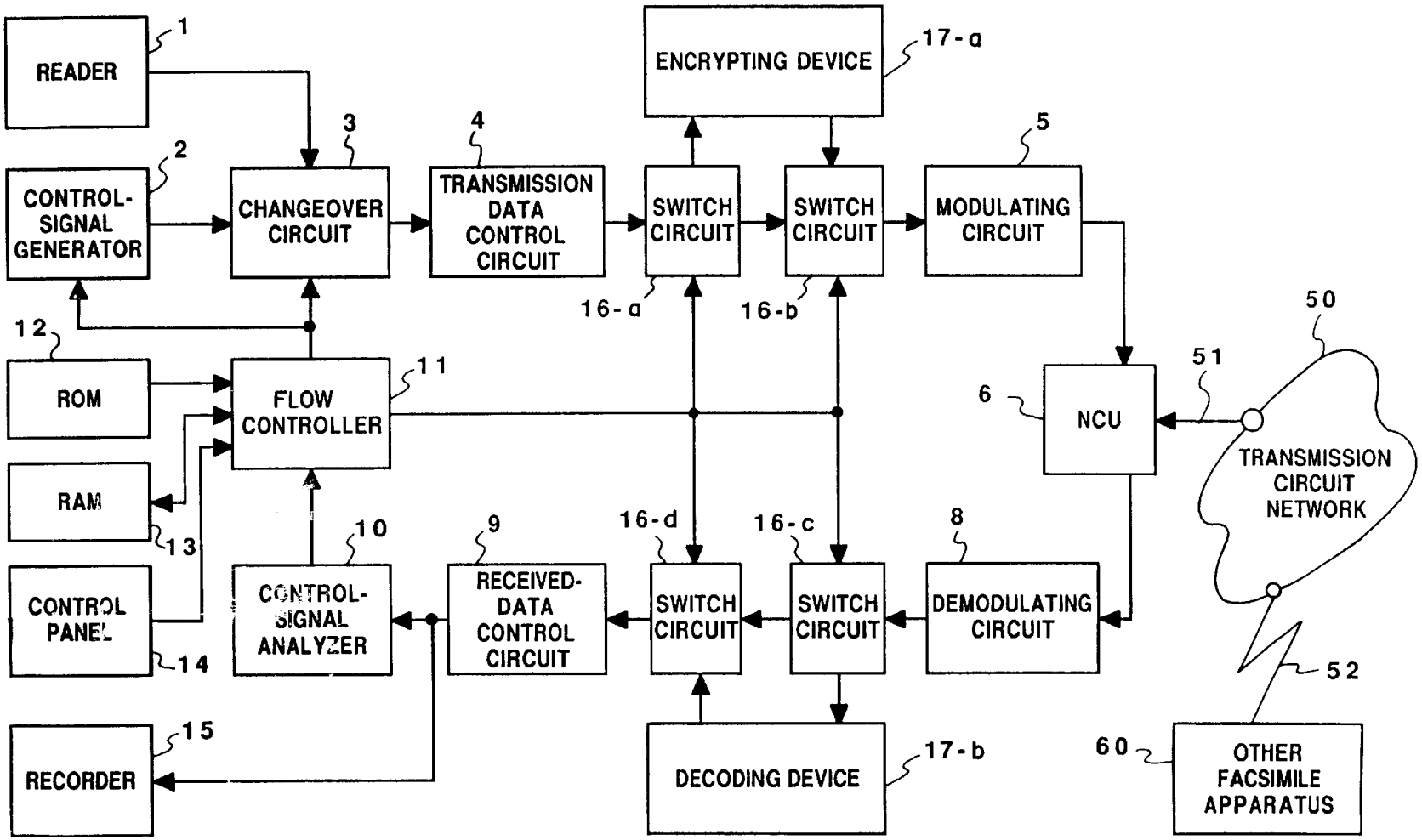
FIG. 1 is a block diagram illustrating a facsimile apparatus according to an embodiment of the present invention.
Figure 5:
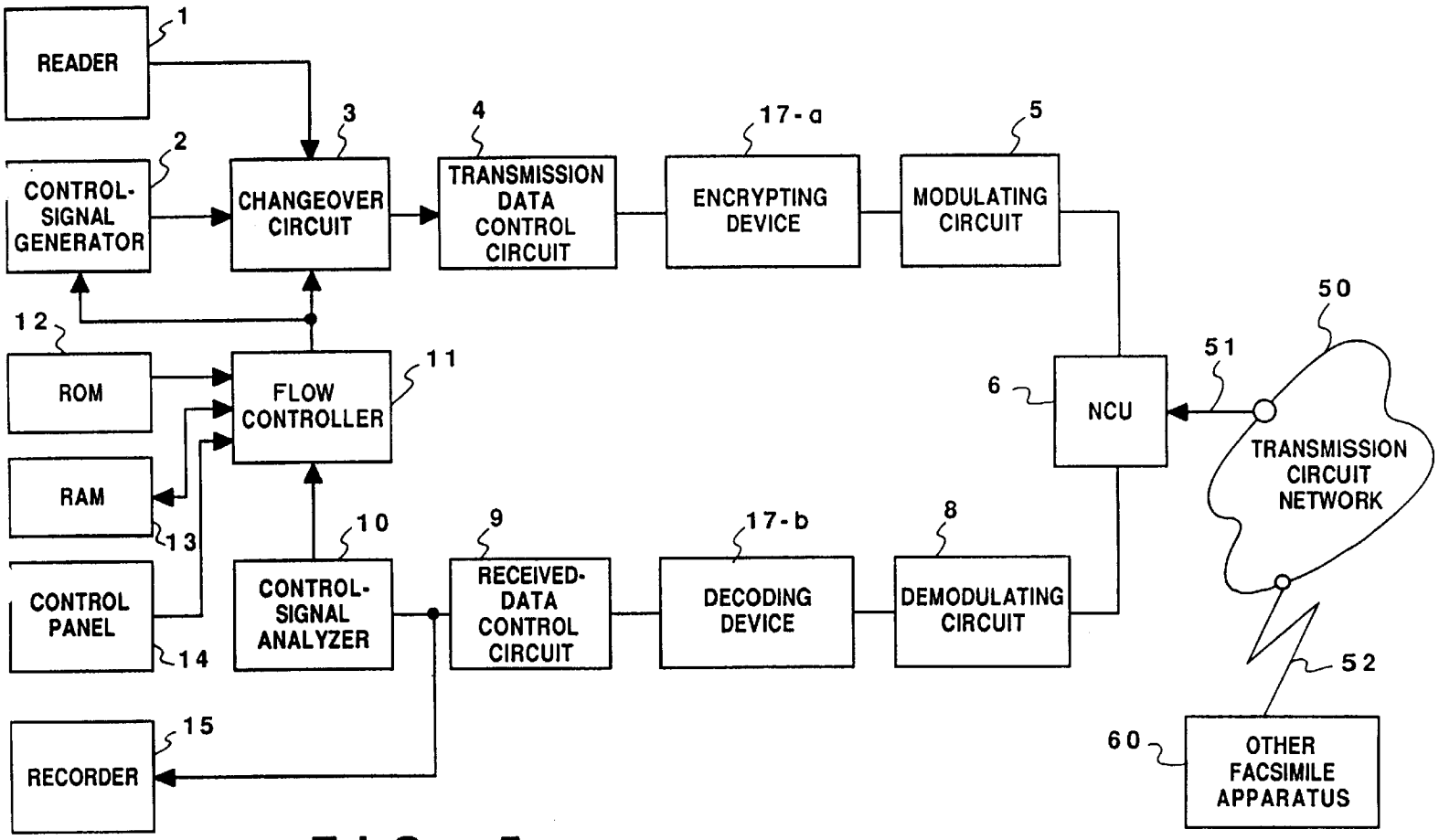
FIG. 5 (PRIOR ART)
FIG. 5 is a block diagram illustrating a facsimile apparatus according to the prior art.

FIG. 1 is a block diagram illustrating a facsimile apparatus according to the present embodiment, in which portions similar to those of FIG. 5 are designated by like reference characters.

In FIG. 1, reader 1 reads image data, converts the data into a corresponding electric signal and delivers the signal to changeover circuit 3. A control signal generating circuit 2 generates a variety of communication control signals for controlling facsimile communication. Under the signal of flow controller 11, the changeover circuit 3 selects either the image signal read by the reader 1 or a control signal generated by the control signal generator 2, and delivers the selected signal to transmission-data control circuit 4. The latter converts the output signal of the changeover circuit 3 into the format of transmission data decided by public facsimile communication standards. The modulating circuit 5 modulates binary transmission data and outputs the result to a switch circuit 16-a. The NCU (network control unit) 6 interfaces the facsimile apparatus of the embodiment with the public telephone transmission circuit network 50. The demodulating circuit 8 demodulates a modulated signal sent from an apparatus on the receiving side (the other facsimile apparatus 60 or the like) via transmission circuit network 50 and transmission line 51. The received-data control circuit 9 converts the received data, which has been demodulated according to a predetermined format, into the processing format of the facsimile apparatus itself. The control signal analyzer 10 extracts a communication control signal from the output signal of the received-data control circuit 9 and analyzes the extracted signal. The flow controller administers overall control the facsimile apparatus, including control of a transmission control procedure, described below, in accordance with a control procedure stored in the ROM 12. The latter stores the processing procedures, etc., of the flow controller 11. The RAM 13 is used as a working memory area when the flow controller 11 executes processing. The control panel 14 is used by an operator to enter various instructions to the facsimile apparatus. The recorder 15 records received image data or image data read by the reader 1. Switch circuits 16-a through 16-d change over the paths of signals under the control of the flow controller 11. The coder 17-a subjects the transmission data to predetermined encryption processing to encode the data. The decoder 17-b restores the received data, which arrives in encrypted form, to the original data that prevailed prior to encryption.

The public telephone transmission circuit network 50 accommodates the connecting lines for an unspecified large number of facsimile apparatus and the like. The transmission line 51, which is a two-wire system, is accommodated in the transmission circuit network 50. The other facsimile apparatus 60 is connected to the transmission network 50.

In this embodiment, the operating mode of the facsimile apparatus can be set at will by entering the proper instruction from the control panel 14.

The operating mode of the facsimile apparatus can be set to the following modes:

(1) A transceiving mode in which transmission/reception of an image signal is always encrypted when facsimile communication is performed with another party.

(2) A transceiving mode in which an image signal or the like is transmitted/received upon encryption if the other party's apparatus possesses an encryption function, and in which an image signal or the like is transmitted/received without the usual encryption if the other party's apparatus does not possess an encryption function.

(3) [This] *There* also is a mode used when the other party's apparatus does not possess an encryption function. In this mode, the apparatus asks for an indication from the operator. When the operator responds, within a predetermined period of time, by entering an enable instruction which allows transmission/reception without encryption of an image signal, the apparatus subsequently performs facsimile communication without encryption.

<Description of Operation (FIGS. 2 through [4)] *4*)>

A transceiving operation in the embodiment having the foregoing arrangement will now be described in detail with reference to FIGS. 2 through 4.

Operation will be described taking as an example a case where the apparatus of the embodiment has been set to mode (1) mentioned above, namely the mode in which the facsimile apparatus is on the sending side and always transmits/receives an image signal upon first encrypting the signal.

Figure 2:
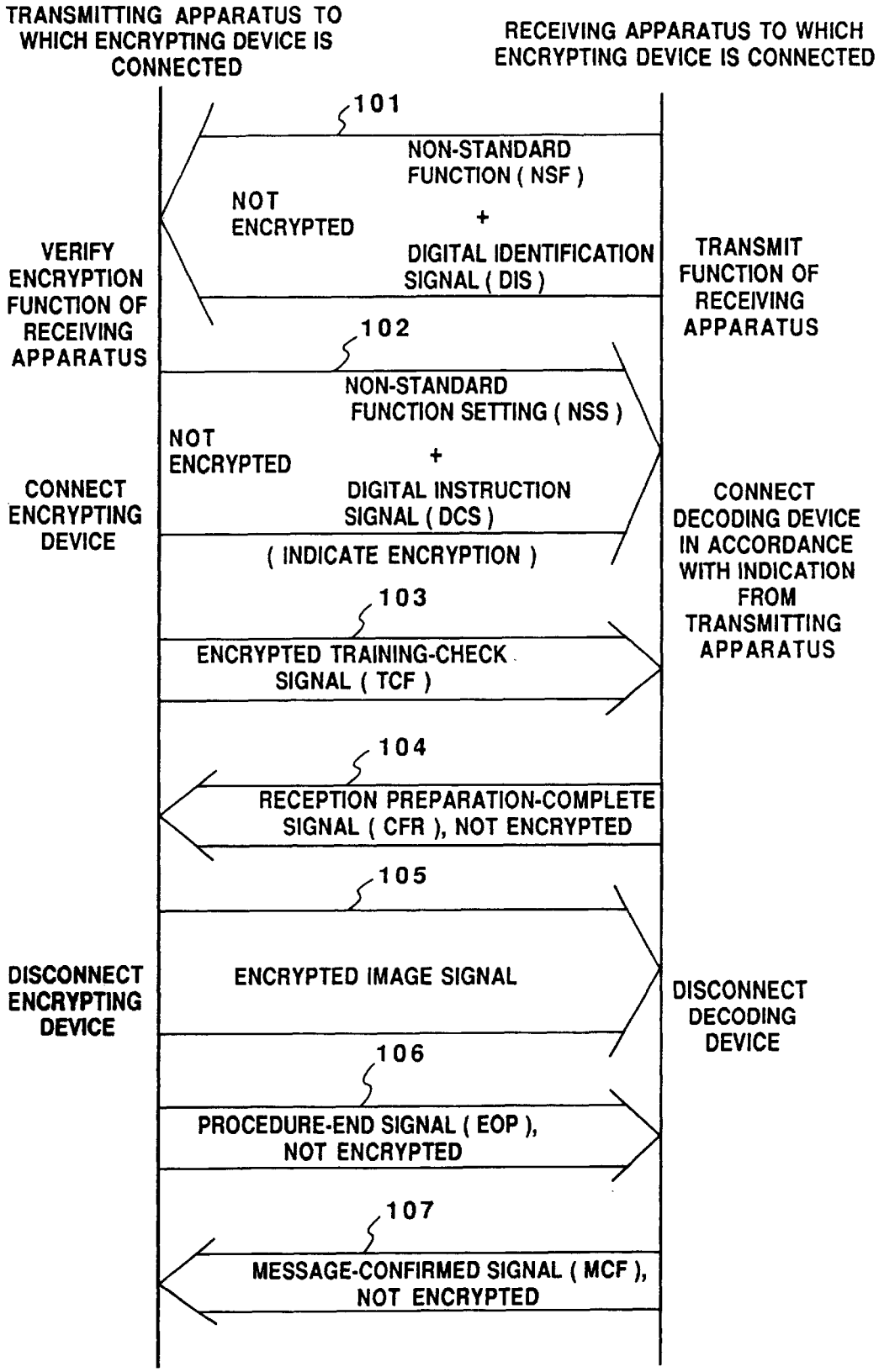
FIG. 2 is a diagram for describing a communication procedure in a case where a facsimile apparatus in the present embodiment is the calling station and transmits an image signal.

FIG. 2 is a diagram for describing communication control in a case where a facsimile apparatus on the sending side and a facsimile apparatus on the receiving side both [having] *have* an encryption processing function. The diagram is for describing a communication procedure for a case where the calling station (sending side) is shown on the left and the called station (receiving side) is shown on the right.

In FIG. 2, numerals 101, 102, 104, 106, 107 denote procedure signals, which are not encrypted. Numeral 103 denotes an encrypted training-check signal, and 105 an encrypted image signal.

In the present embodiment, the flow controller 11 on both the sending and receiving sides is set in such manner that, in an initial state, the output of the switch circuit 16-a is connected to the switch circuit 16-b and the switch circuit 16-b delivers the signal from the switch circuit 16-a to the modulating circuit 5.

Further, the flow controller 11 on both the sending and receiving sides is set in such manner that, in an initial state, the switch circuit 16-c delivers the signal from the demodulating circuit 8 to the switch circuit 16-d and the switch circuit 16-d delivers the signal from the switch circuit 16-c to the received-data control circuit 9.

In a case where facsimile communication is to be carried out when the set state mentioned above prevails, first well-known call processing is executed. For example, when the other facsimile apparatus 60 is called from the facsimile apparatus of the embodiment and the other facsimile apparatus 60 responds so that a communication line is formed between the two apparatus, first the other facsimile apparatus 60 transmits a well-known pre-procedure signal 101 (NSF, DIS), which has not been encrypted, to the apparatus on the calling side.

The pre-procedure 101 is a signal which communicates the function possessed by the apparatus on the called side to the apparatus on the calling side. In FIG. 2, the apparatus on the called side is capable of conveying, by a non-standard function (NSF), whether or not it possesses an encryption function of the kind shown in FIG. 1. The format in this case is well known and need not be described in detail.

The pre-procedure signal 101 is sent to the control-signal analyzer 10 via the NCU 6, demodulating circuit 8, switch circuit 16-c, switch circuit 16-d and received-data control circuit 9 of the apparatus on the calling side. The pre-procedure signal is analyzed by the control-signal analyzer 10, whose output is delivered to the flow controller 11.

When the apparatus on the called side is confirmed as being one having an encryption function, the pre-procedure signal (NSS, DCS) indicated at 102 in FIG. 2 is transmitted to the apparatus on the called side by the flow controller 11.

The pre-procedure signal 102 is a signal which indicates, to the receiving side, the communication mode, etc., in the transmission of the ensuing image signal. In FIG. 2, the signal 102 is transmitted upon incorporating an indication calling for encrypted communication in a non-standard function-setting (NSS) signal, and the signal conveys transmission of an ensuing image signal upon the encryption thereof.

Thereafter, the flow controller 11 of the facsimile apparatus on the sending side is set in such a manner that the output of switch circuit 16-a is delivered to the coder 17-a and the switch circuit 16-b outputs the signal from the coder 17-a.

Meanwhile, the flow controller 11 of the facsimile apparatus on the receiving side changes over the switch circuits in accordance with an indication for performing encrypted communication contained in the non-standard function-setting (NSS) signal of the pre-procedure signal 102. This flow controller 11 is set in such a manner that the output of switch 16-c will be delivered to the decoder 17-b and the output from switch circuit 16-d will become the output from switch circuit 16-c.

These set states of the switches on the sending and receiving sides are established at transmission of the training-check signal 103, which is transmitted subsequently, and at transmission of an image signal 105, described below. At transmission of other signals, these switches are placed in a state which does not allow signal passage through the coder 17-a and decoder 17-b.

Furthermore, the switches on the receiving side are placed in similar set states only at reception of a training-check signal corresponding to an instruction on the sending side and at reception of an image signal. At other times, these switches are placed in a state which does not allow signal passage through the coder 17-a and decoder 17-b.

Consequently, on the sending side, the transmission training-check signal and image signal are subsequently modulated by the modulating circuit 5 following encrypting by the coder 17-a, and the modulated signals are transmitted to the other party's apparatus.

On the receiving side, these modulated, encrypted data are demodulated by the demodulating circuit 8, after which the decoder 17-b restores the demodulated data to the original signals that prevailed prior to encryption.

As a consequence, the flow controller 11, which transmits the pre-procedure signal 102 and changes over the switch circuits, instructs the control-signal generator 2 to generate the training-check signal. This signal is subjected to encryption processing by the coder 17-a, the encrypted signal is modulated by the modulating circuit 5, and the resulting signal is transmitted to the facsimile apparatus on the receiving side.

The encrypted training-check signal is indicated at numeral 103 in FIG. 2. This signal is for performing a check to determine whether the facsimile apparatus on the receiving side is capable of receiving an image signal normally at the present transmission speed and communication specifications.

In the other facsimile apparatus 60 which has received the encrypted training-check signal 103, the set states of the switches are in accordance with the indication of the foregoing pre-procedure signal 102, as mentioned above. After being demodulated by the demodulating circuit 8, the signal is decoded by the decoder 17-b to be converted into the signal that prevailed prior to encryption. As a result of reception of the reception training-check signal, a reception preparation-complete signal (CFR) is [send] *sent* back.

At this time the coder 17-a is in the cut-off state on the receiving side, and therefore the control signal from the control-signal′ generator 2 is modulated by the modulating circuit 5 and transmitted to the sending side without being encrypted. This signal, shown at numeral 104 in FIG. 2, conveys to the sending side the fact that the receiving side is capable of correctly receiving the pre-procedure signal 103, and that the preparations for reception have been completed.

On the sending side, which has received signal 104, preparations for transmission in accordance with the present communication specifications will have been completed and the apparatus will be in a state capable of transmission at any time. Consequently, a read image signal from the reader 1 is subjected to encryption processing similar to that described above, and the encrypted signal is transmitted to the receiving side.

At this time the flow controller 11 performs control in such a manner that the output from the changeover circuit 3 to the transmission-data control circuit 4 becomes the read data from the reader 1, whereby the read data from the reader 1 is outputted as image signal 105 to the transmission channel 51 via the transmission-data control circuit 4, coder 17-a, modulating circuit 5 and NCU 6.

The encrypted image signal is delivered to, say, the other facsimile apparatus 60 via the transmission circuit network 50 and transmission line 52.

On the receiving side, the encrypted image signal is demodulated by the demodulating circuit 8, after which the demodulated signal is restored by the decoder 17-b to the signal that prevailed prior to encryption. This signal is sent to the recorder 15 via the received-data control circuit 9, and the recorder 15 prints out the data indicated by the received signal.

The arrangement is such that when this transmission of the image signal is completed, the flow controller 11 on the sending side causes the output of switch circuit 16-a to be connected to switch circuit 16-b and causes switch circuit 16-b to output the signal from switch circuit 16-a to the modulating circuit 5. Thus, a procedure-end signal (EOP) 106, which is not encrypted, is transmitted.

At this time, on the receiving side, the arrangement is such that the switch circuit 16-c outputs the signal from the demodulating circuit 8 to the switch circuit 16-d and the switch circuit 16-d outputs the signal from the switch circuit 16-c to the received-data control circuit 9. As a consequence, the procedure-end signal (EOP) 106, which is not encrypted, is analyzed by the control-signal analyzer 10 on the receiving side, and the flow controller is capable of recognizing that the apparatus on the sending side will not send any further image signals.

The apparatus on the receiving side, which has received the procedure-end signal (EOP) 106, transmits a message confirmation signal (MCF) 107 to the sending side without encryption, thereby notifying the sending side of the fact that the procedure-end signal (EOP) 106 has been received.

By virtue of the foregoing operation, only the training-check signal and image signal are encrypted prior to transmission to the other party, and the other party is capable of correctly receiving the encrypted data represented by these two signals.

Figure 3:
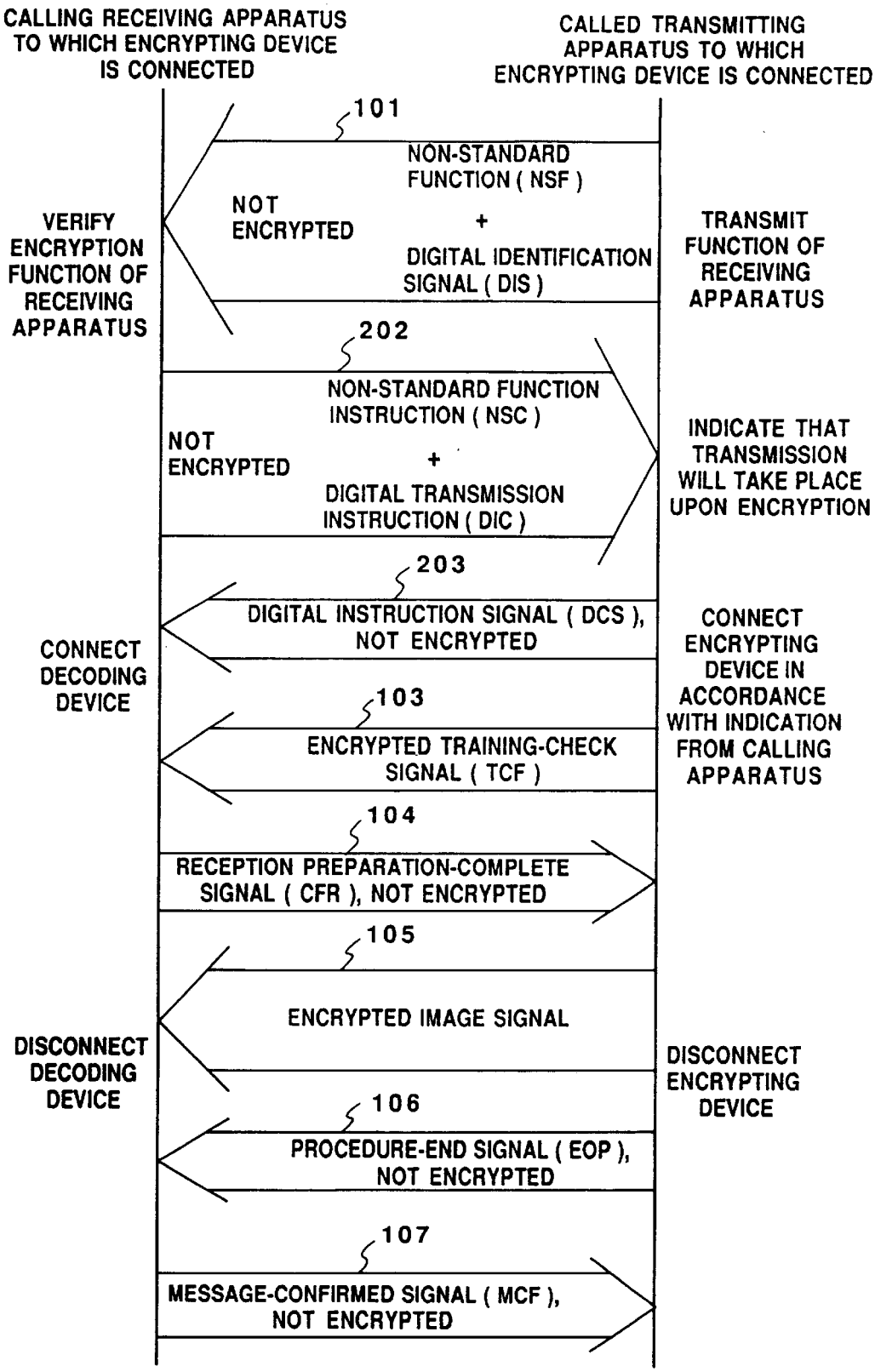
FIG. 3 is a diagram for describing a communication procedure in a case where a facsimile apparatus in the present embodiment performs polling communication.

Reference will be had to FIG. 3 to describe a communication procedure for a case where so-called polling communication is carried out, in which the facsimile apparatus of the embodiment is the calling station and is on the receiving side to receive an image signal from the other party's apparatus.

In FIG. 3, communication procedures and the contents of communication similar to those in FIG. 2 are designated by like procedure numbers and need not be described again.

In FIG. 3, procedures indicated at 202 and 203 differ from those shown in FIG. 2.

In all cases, the apparatus on the called side first sends the pre-procedure signal, indicated at 101, which includes the non-standard function (NSF) and digital identification signal (DIS). As a result, the calling side, which has identified the fact that the apparatus on the called side possesses an encryption function and is capable of facsimile communication using encrypted image signals, transmits a pre-procedure signal, indicated at 202, which includes a non-standard function instruction (NSC) (which in turn includes an instruction indicating that the training-check signal and image signal are to be transmitted upon being encrypted) and a digital transmission instruction (DIC) for causing an image signal to be transmitted by the apparatus on the called side.

The called apparatus, which has received this procedure signal, determines that it is a request for polling communication and sends back a digital instruction signal (DCS) to inform the calling station that the called apparatus will transmit an image signal.

Since preparations for communication of an image signal are completed by the forgoing procedure, control is executed in the apparatus on the called side in such a manner that a transmission signal is directed through the coder 17-a in order to be encrypted and then transmitted. In the apparatus on the calling side, on the other hand, control is executed in such a manner that the received signal is directed through the decoder 17-a so that the encrypted signal is restored to the original signal.

Thereafter, the procedures 103 through 106 are executed. The coder 17-1 and decoder 17-b are once again excluded from the transmitted/received signal processing path, transmission/reception of the procedure signals 107, 108, which are not encrypted, is executed, and polling communication is terminated.

Figure 4:
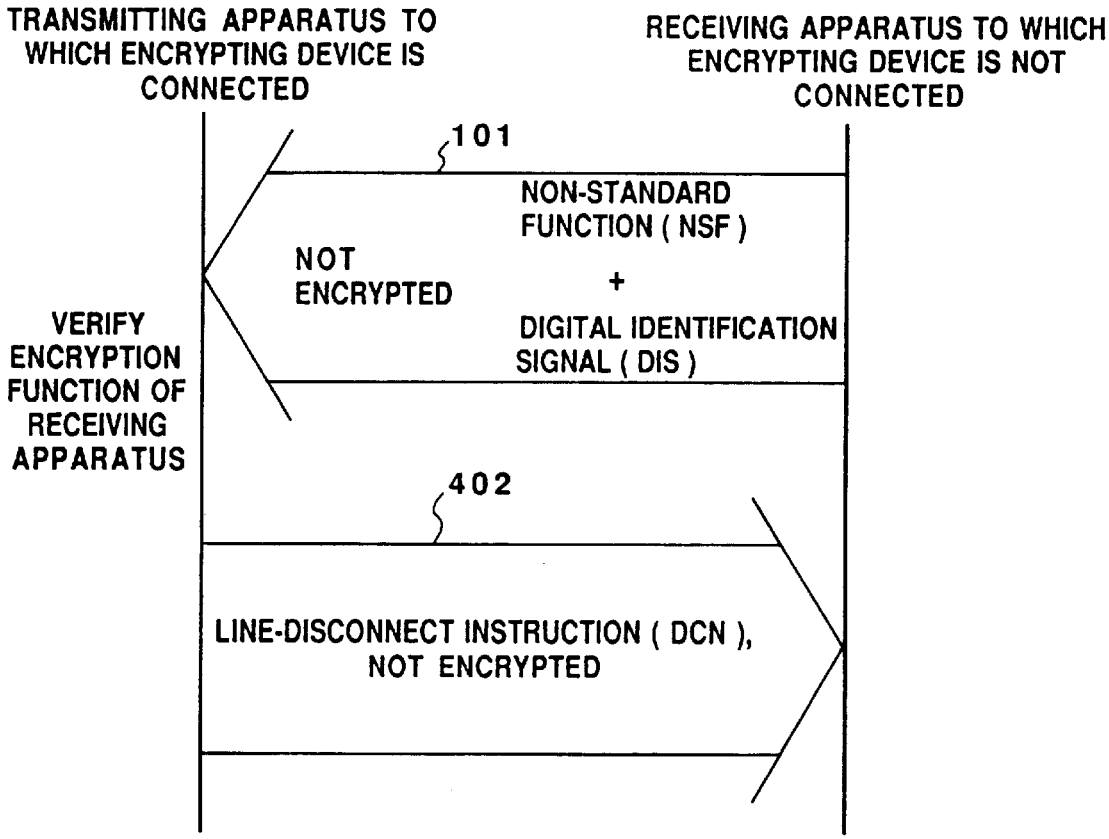
FIG. 4 is a diagram for describing a communication procedure in a case where a facsimile apparatus in the present embodiment communicates with a facsimile apparatus not having an encryption function.

Finally, reference will be had to FIG. 4 to describe control in a case where, when the apparatus of the present embodiment calls another facsimile apparatus, it recognizes that the apparatus on the called side does not possess an encryption function of the kind shown in FIG. 1 in response to the procedure signal 101 sent from the other party's apparatus.

As shown in FIG. 4, the functions possessed by the apparatus on the called side are conveyed to the apparatus on the calling side by the procedure signal 101. When the flow controller 11, which has received the called-side function information from the control-signal analyzer 10, determines that the other party's apparatus does not possess an encryption function, it transmits a procedure signal 402, which includes a line-disconnect instruction (DCN), and declares that no further communication will take place. The NCU 6 is then controlled to open a DC loop, which has been formed in the line, thereby restoring the line.

Thus, in accordance with the present embodiment, encryption processing is not applied to procedure signals, and only a training-check signal and image signal are encrypted. As a result, additional time required by encrypting of procedure signals can be eliminated, thereby making it possible to determine more rapidly whether communication is possible. In addition, by preventing transmission of an encrypted signal to a facsimile apparatus not possessing an encryption function, erroneous operation of the receiving facsimile apparatus can be avoided and transmission of an encrypted signal to a speaker on a telephone by incorrect dialing can be prevented.

In the example of the facsimile apparatus described above, a mode in which transmission/reception of image signals is always carried out following encryption is set in a case where communication is performed with another party's apparatus. If the facsimile apparatus on the called side does not possess an encryption function, the line is opened immediately and facsimile communication does not take place. However, the invention is not limited to the foregoing example. An arrangement can be adopted in which it is possible to set the facsimile apparatus to any of the aforementioned modes and carry out facsimile communication in any of these modes.

Even in such an arrangement, control can be executed in such a manner that ordinary transmission/reception without encryption will be performed without disconnecting the telephone line and terminating communication, depending upon the contents of the communication.

Specifically, assume a case where the operating mode of the apparatus has been set, by an operator input from the control panel 14, to the aforementioned mode (2), namely the mode in which image signals are or are not encrypted before transmission/reception if the other party's apparatus does or does not possess an encryption function, respectively. When it is discriminated in this case that the other party's apparatus does not possess an encryption function, as is determined from the pre-procedure signal 101 from the called side including the non-standard function (NSF) and the digital identification signal (DIS), it will suffice to hold the coder 17-a and decoder 17-b in the disconnected state without performing changeover control of the switch circuits 16-a through 16-d. In the procedures 103, 106 shown in FIG. 2 or 3, it will suffice to perform control in such a manner that the transmission data are transmitted without being encrypted and the received data are sent to the received-data control circuit 9 without being decoded.

Figure 6A:
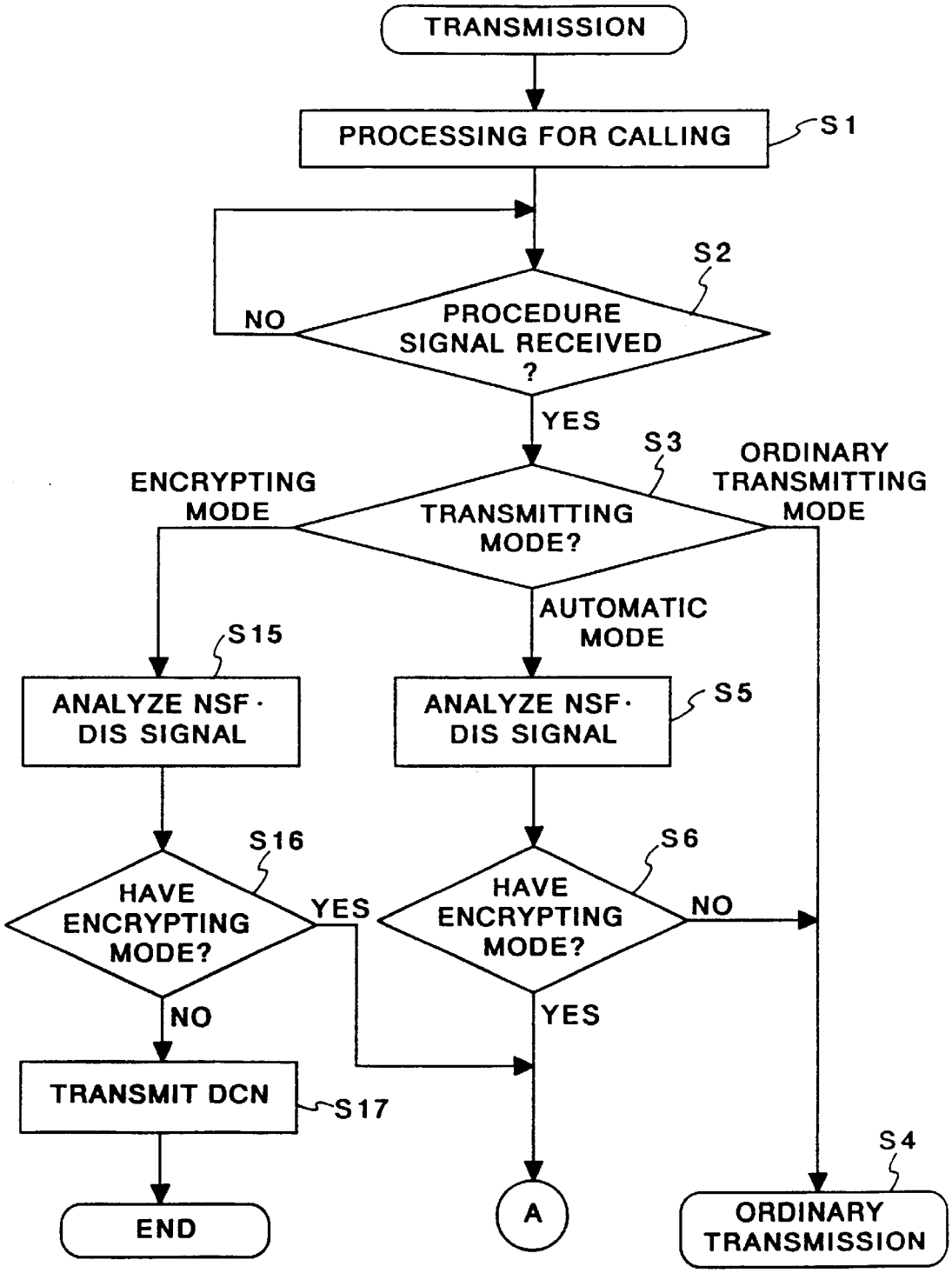
FIG. 6A and FIG. 6B are flowchart illustrating the control operation of the flow controller 11 at the time of transmission.
Figure 6B:
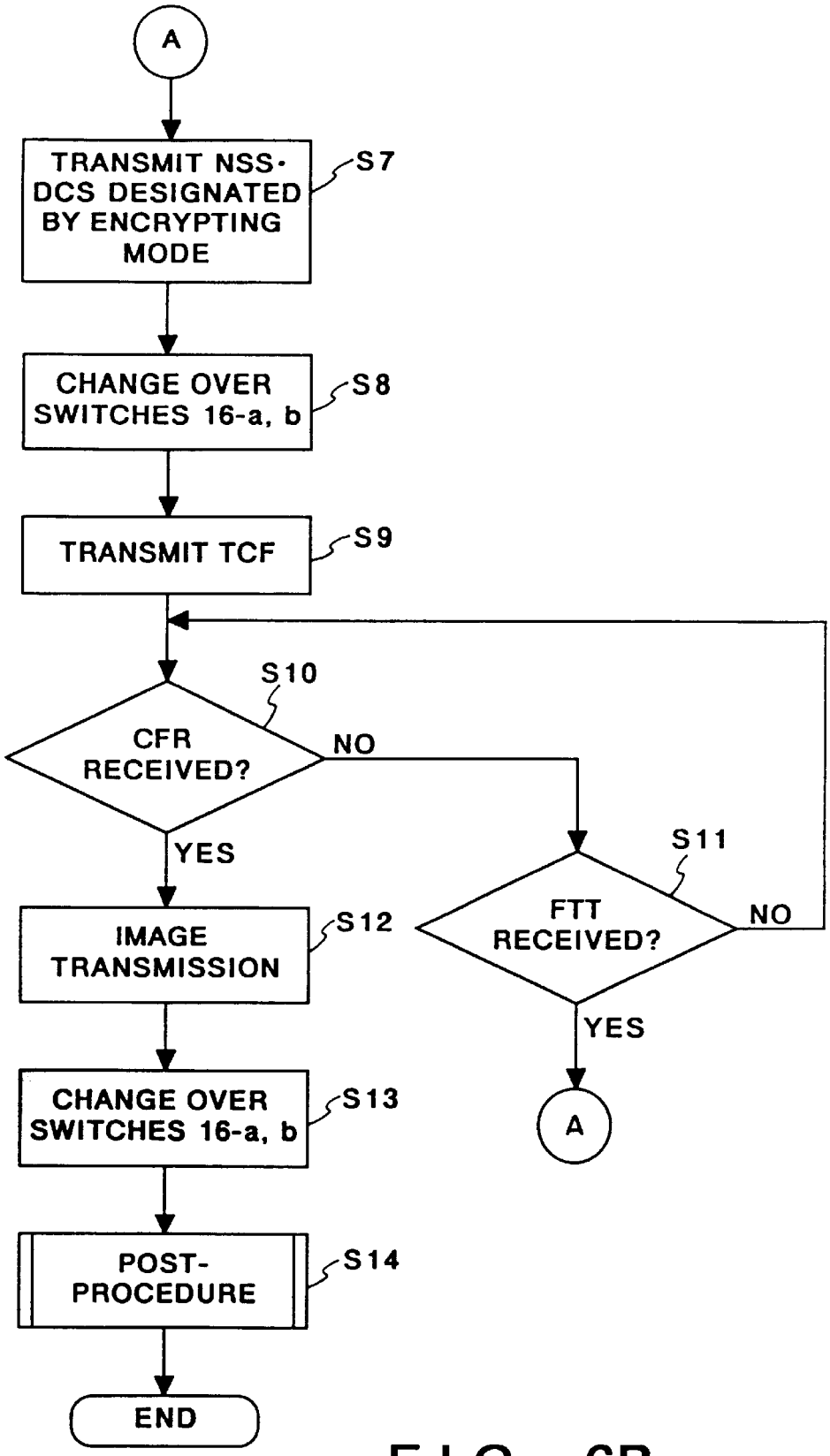
Figure 7:
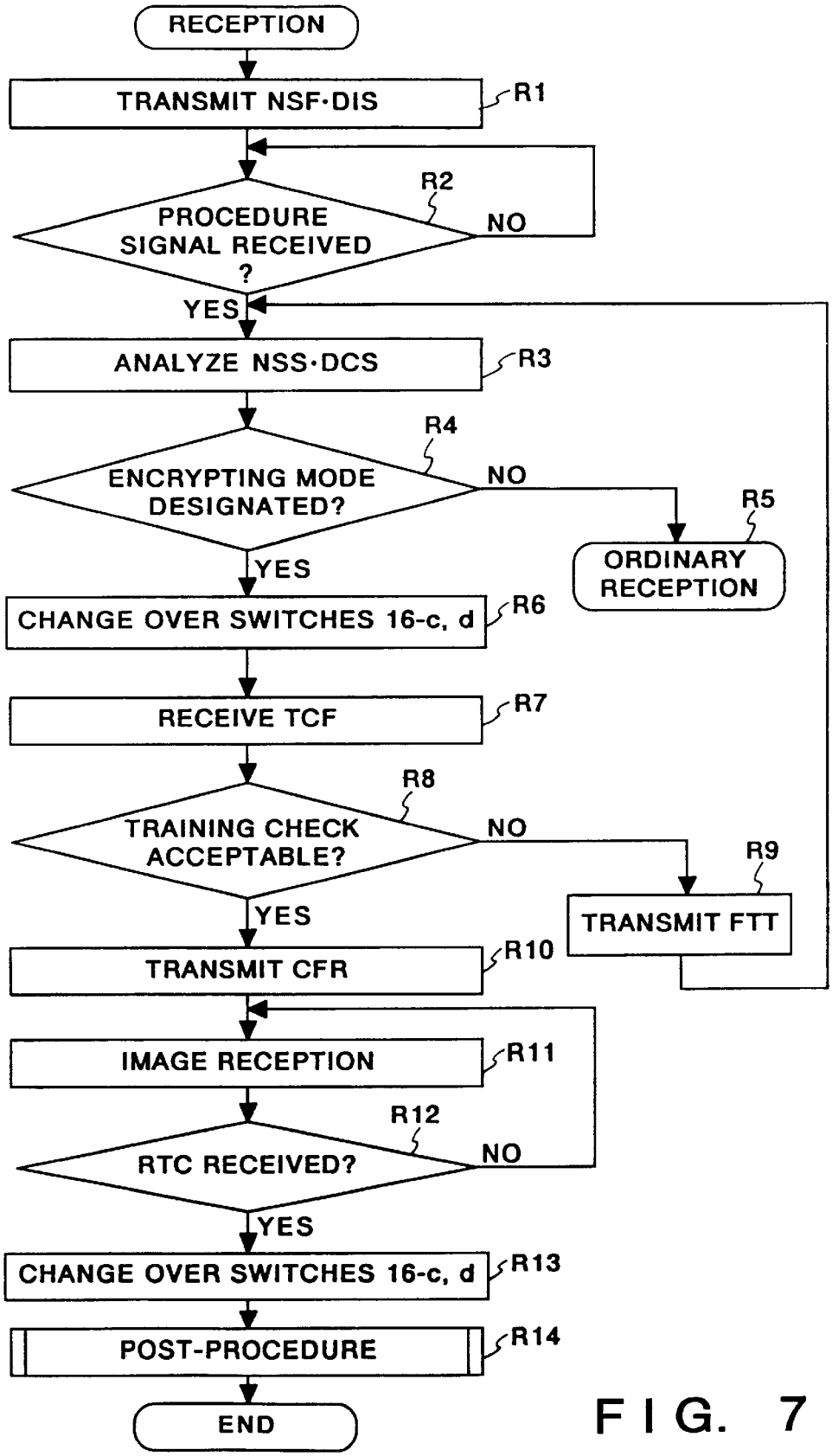
FIG. 7 is a flowchart illustrating the control operation of the flow controller 11 at the time of reception.

FIG. 6A and FIG. 6B are flowchart illustrating the control operation of the flow controller 11 at the time of transmission, and FIG. 7 is a flowchart illustrating the control operation of the flow controller 11 at the time of reception.

At the time of transmission, the transmitting mode is designated by an input from the keys (not shown) of the control panel 14, and the number of the party to be called is entered from these keys, whereupon processing for calling the entered number is executed at step S1 of the flowchart in FIG. 6A. When the line is connected to the other party, the system waits for receipt of a facsimile procedure signal (specifically, NSF.DIS in case of a G3 machine) from the other party's apparatus at step S2. [when] *When* the procedure signal is received, the program proceeds to step S3, at which the transmitting mode that has been set prior to transmission is discriminated. In a case whereby the ordinary transmitting mode has been set, the program proceeds to step S4, at which ordinary transmission processing is executed. The program proceeds to step S5 in a case where an automatic mode has been set, and to step S15 in a case where the encrypting mode has been set.

The received NSF.DIS signal is analyzed at step S5, and it is determined at step S6 whether the other party's apparatus has an encrypting mode. If the other party's apparatus does not have an encrypting mode, then the program proceeds from step S6 to step S4, where an ordinary transmission is made. In a case where the other party's apparatus does have an encrypting mode, NSS is set to information indicative of an encrypting mode designation, and NSS.DCS is transmitted at step S7 of the flowchart in FIG. 6B.

Switches 16-a, 16-b are changed over to the side of coder 17-a at step S8, and TCF is encrypted and transmitted at step S9.

Next, at steps S10 and S11, the system waits for receipt of CFR or FTT (training failure) from the other party's apparatus. When CFT is received, the program proceeds to step S12, at which transmission of an encrypted image is performed. When FTT is received, the program returns to step S7, at which the transmission speed is made to fall back and the training sequence (steps S9, S10 and S11) is executed again. RTC (a signal for restoration to reception of the procedure signal at six consecutive EOL's) is transmitted at step S12 at the end of one page of an image transmission, and the switches 16-a, 16-b are changed over at step S13 to disconnect the coder 17-a. A post-procedure (transmission of EOP, reception of MCF from the other party's apparatus, transmission of DCS) is executed at step S14, and image processing is executed. If there is a next page of an image for transmission following the end of the one page of image transmission at step S12, MPS (a multiple-page signal) or EOM (a message-end signal) is transmitted, and MCF is received, after the switches 16-a, 16-b are changed over at step S13. Transmission of the next page of the image is carried out after the switches 16-a, 16-b are again changed over to the side of the coder 17-a.

If it is found at step S3 of the flowchart in FIG. 6A that the encrypting mode has been set, then analysis of NSF.DIS is performed at step S15 of the flowchart in FIG. 6B, and it is determined at step S16 whether the other party's apparatus has an encrypting mode. In a case where the other party's apparatus has an encrypting mode, the program proceeds to step S7. If the other party's apparatus does not have an encrypting mode, DCN is detected at step S17 and a liquid-crystal display device on the control panel 14 is made to display a message to the effect that the other party's apparatus does not possess an encrypting mode. At step S17, the recorder 15 outputs a printed report, indicative of the results of transmission, bearing the message that the other party's apparatus does not possess the encrypting mode.

In a case where an image is transmitted upon encryption, the recorder 15 outputs (at step S14) a printed report, indicative of the results of transmission, bearing a message that the transmission was performed in the encrypting mode.

Operation in the case of reception will be described next.

When there is an incoming call from the circuit network 51, the program proceeds to step R1 in FIG. 7 to transmit NSF.DIS after the line is connected. The system waits at step R2 for receipt of a facsimile procedure signal (NSS.DCS or DCN) from the other party's apparatus. At the time of reception of DCN, the line is opened and reception processing is ended. At reception of NSS.DCS, NSS.DCS are analyzed at step R3, and it is determined at step R4 whether the encrypting mode has been designated. If the encrypting mode has not been designated, the program proceeds to step R5 and ordinary reception processing is executed. If the encrypting mode has been designated, then the switches 16-c, 16-d are changed over to the side of decoder 17-b at step R6.

Next, at step R7, the encrypted TCF from the other party's apparatus is received, this is decoded by the decoder 17-b, and a training-check is performed. It is determined at step R8 whether the result of the training-check is acceptable. If the result of the training-check is not acceptable, FTT is transmitted at step R9, and the program returns to step R3.

When CFR is transmitted at step R10, image reception is carried out at steps R11[.], R12 until RTC is received. When RCT has been received, the switches 16-c, 16-d are changed over at step R13, thereby disconnecting the decoder 17-b. A post-procedure (reception of EOP, transmission of MCF, opening of the line by reception of DCN) is executed at step R14.

In a case where MPS is received at step R14, the switches 16-c, 16-d are again changed over to the side of decoder 17-b after MCF is transmitted, and the program returns to step R11. In a case where EOM is received at step R14, the program returns to step R3 after MCF is transmitted.

The following actions and effects can be achieved in accordance with the present embodiment described above:

(1) By encrypting only a training-check signal and image signal in a communication procedure, it is possible to shorten the time required for transmission/reception of communication procedure signals, all of which must first be encrypted in the prior art but are not encrypted in the present invention.

(2) By arranging it so that unnecessarily encrypted signals are not transmitted, the other party's apparatus is not induced to operate erroneously if it should not possess an encryption function.

(3) If a connection should happen to *be* made to an ordinary telephone as by incorrect dialing, an encrypted signal offensive to the ear of the called party will not be transmitted, thereby making it possible to lessen any discomfort caused.

(4) In communication with a facsimile apparatus not having an encryption function, control can be performed in such a manner that ordinary transmission/reception is carried out without encryption. By setting the facsimile apparatus of the present invention to this operating mode, the apparatus can be made operable just as an ordinary facsimile apparatus, even though it possesses an encryption function.

In accordance with the present invention as described above, encryption processing is not applied to procedure signals, and only a training-check signal and image signal are encrypted. As a result, additional time required by encrypting of procedure signals can be eliminated, thereby making it possible to determine more [5] rapidly whether communication is possible. In addition, by preventing transmission of an encrypted signal to a facsimile apparatus not possessing an encryption function, erroneous operation of the receiving facsimile apparatus can be avoided and transmission of an encrypted signal to a speaker on a telephone by incorrect dialing can be prevented.

As many apparently widely different embodiments of the present invention can be made without departing from the spirit and scope thereof, it is to be understood that the invention is not limited to the specific embodiments thereof except as defined in the appended claims.

What is claimed is:

[1. A communication apparatus for subjecting communication information to encryption, comprising:

input means for encrypting the information;

encrypting means for encrypting information;

generating means for generating a procedure signal;

encryption control means for controlling said encrypting means to cause said encrypting means to encrypt the information, and to not encrypt a procedure signal which accompanies transmission of the information; and transmission means for transmitting the encrypted information.]

[2. The apparatus according to claim 1, wherein said encryption control means controls said encrypting means to not execute any encryption prior to start of communication, and controls said encrypting means after it is verified that the receiving side possesses a decryption function.]

[3. The apparatus according to claim 2, wherein said generating means generates a training-check signal, and said encryption control means controls said encrypting means to encrypt the training-check signal transmitted before transmission of the information.]

[4. The apparatus according to claim 1, further comprising first encryption halting means for allowing communication of the information without encryption if the receiving side does not possess a decryption function.]

[5. The apparatus according to claim 1, further comprising first transmission suspending means for suspending a transmission operation if the receiving side does not possess an encryption function.]

[6. The apparatus according to claim 1, wherein said encryption control means controls whether or not encryption is to be executed by controlling passage of transmission information through said encrypting means.]

[7. A communication apparatus for decrypting encrypted communication information that has been received, said apparatus comprising:

receiving means for receiving encrypted communication information;

decrypting means for decrypting the received communication information; and decryption control means for controlling said decrypting means to cause said decrypting means to decrypt the information and to not decrypt a procedure signal which accompanies transmission of the information.]

[8. The apparatus according to claim 7, wherein said decryption control means controls said decrypting means to not execute any decrypting prior to start of communication, and controls said decrypting means to decrypt the information and to not decrypt a procedure signal which accompanies the transmission of the information.]

[9. The apparatus according to claim 7, further comprising:

informing means for informing a transmitting side of a communication of presence of decrypting means for decrypting the encrypted information, wherein said decryption control means controls said decryption means to decrypt the information which is sent from the transmitting side of a communication in accordance with information from said informing means, and controls said decrypting means to not decrypt a procedure signal which accompanies the transmission of the information.]

[10. The apparatus according to claim 9, wherein said decryption control means controls said decrypting means to not execute any decrypting prior to start of communication, and controls that the information is decrypted, after it is verified that the transmitting side of communication possesses an encryption function.]

[11. The apparatus according to claim 7, wherein said decryption control means controls said decrypting means to cause said decrypting means to decrypt a training-check signal transmitted before reception of the information.]

[12. An apparatus for subjecting communication information to encryption and decrypting, comprising:

input means for inputting information;

receiving means for receiving information;

generating means for generating a procedure signal;

encrypting-decrypting means for encrypting and decrypting information; and encryption-decryption control means for controlling said encrypting-decrypting means to cause said encrypting-decrypting means to encrypt or decrypt the information and to not encrypt or decrypt a procedure signal which accompanies the transmission of the information.]

[13. The apparatus according to claim 12, wherein said encryption-decryption control means controls said encrypting-decrypting means to not execute encryption or decryption prior to start of communication, and in case where the apparatus itself is an apparatus on a transmitting side, controls said encrypting-decrypting means, after it is verified that the receiving side possesses a decryption function, to encrypt the information and to not encrypt a procedure signal which accompanies the transmission of the information.]

[14. The apparatus according to claim 13, further comprising encryption-decryption halting means for allowing communication of the information without encryption if the receiving side does not possess a decryption function.]

[15. The apparatus according to claim 12, further comprising second transmission suspending means for suspending a transmission operation if the receiving side does not possess an encryption function.]

[16. The apparatus according to claim 12, wherein said encryption-decryption control means controls whether or not encryption is to be executed by controlling whether or not transmission information is to be passed through encrypting means of said encrypting-decrypting means.]

[17. The apparatus according to claim 12, wherein said encryption-decryption control means controls said encrypting-decrypting means to not execute any decrypting prior to start of communication, and in a case where the apparatus itself is an apparatus on a receiving side, controls said encrypting-decrypting means to decrypt the information and to not decrypt a procedure signal which accompanies the transmission of the information.]

[18. The apparatus according to claim 12, further comprising:

informing means for informing a transmitting side of a communication of presence of decrypting means for decrypting the encrypted information, wherein said encryption-decryption control means controls said encrypting-decrypting means to decrypt the information which is sent from a transmission side of a communication in accordance with information from said informing means, and controls said encrypting-decrypting means to not decrypt a procedure signal which accompanies the transmission of the information.]

[19. The apparatus according to claim 18, wherein said encryption-decryption control means controls said encrypting-decrypting means to not execute encryption/decryption prior to start of communication, and controls that the information is decrypted, after it is verified that the transmission side of a communication apparatus possesses a decryption function.]

[20. The apparatus according to claim 12, wherein said encryption-decryption control means controls said encrypting-decrypting means to cause said encrypting-decrypting means to encrypt or decrypt a training-check signal transmitted/received before transmission or reception of the information.]

[21. A communication method for communication apparatuses for subjecting communication information to encryption, comprising the steps of:

inputting information;

generating a procedure signal;

encrypting information inputted at the input step;

disabling encrypting of a procedure signal generated at the generating step and which accompanies transmission of the information; and transmitting the encrypted information and the procedure signal.]

[22. The method according to claim 21, wherein encryption is not executed prior to start of communication, and after it is verified that a receiving side, at transmission of a communication, possesses a decryption function the information is encrypted and the procedure signal which accompanies the transmission of the information is not encrypted.]

[23. The method according to claim 21, further comprising the step of allowing communication of the information without encryption if it is verified that a receiving side does not possess a decryption function.]

[24. The method according to claim 21, further comprising the step of suspending a transmission operation of a sending side if it is verified that the receiving side does not possess an encryption function.]

[25. The method according to claim 21, further comprising generating a training-check signal in the generating step, encrypting the training-check signal in the encrypting step, and transmitting the encrypted training-check signal in the transmitting step.]

[26. A communication method for communication apparatuses for decrypting encrypted communication information that has been received, comprising the steps of:

receiving communication information;

separating the communication information into encrypted information and a procedure signal; and decrypting the encrypted information and preventing decrypting and a procedure signal.]

[27. The method according to claim 26, wherein decrypting is not executed prior to start of communication, and the encrypted information is decrypted, and a procedure signal which accompanies the transmission of the encrypted information is not decrypted.]

[28. The method according to claim 26, further comprising the step of decrypting the encrypted information which is sent from a transmitting side of a communication in accordance with information of presence of decrypting function of decrypting the encrypted communication information from a receiving side to the transmitting side, and not decrypting a procedure signal which accompanies the transmission of the encrypted information.]

[29. The method according to claim 28, wherein decrypting is not executed prior to start of communication, and the encrypted information is decrypted, after it is verified that the transmitting side of a communication possesses an encryption function.]

[30. The method according to claim 28, further comprising separating the encrypted information, a training-check signal and the procedure signal in the separating step, and decrypting the training-check signal in the decrypting step.]

[31. A communication method for communication apparatuses for subjecting communication information to encryption and decrypting processing, comprising the steps of:

inputting information;

generating a procedure signal;

encrypting information inputted at the input step and not encrypting the procedure signal generated at the generated step;

receiving communication information;

separating encrypted information and a procedure signal from the communication information; and decrypting the information and not decrypting the procedure signal separated at the separation step.]

[32. The method according to claim 31, wherein encryption and decryption are not executed prior to start of communication, and in a case where the apparatus itself is an apparatus on a transmitting side, after it is verified that a receiving side at transmission of a communication possesses a decryption function, the information is encrypted and a procedure signal which accompanies the transmission of the information is not encrypted.]

[33. The method according to claim 32, further comprising the step of allowing communication of the information without encryption if it is verified that the receiving side does not possess a decryption function.]

[34. The method according to claim 31, further comprising the step of suspending a transmission operation in a case where the receiving side does not possess an encryption function.]

[35. The method according to claim 31, wherein decrypting is not executed prior to start of communication, and in a case where the apparatus itself is an apparatus on a receiving side, the encrypted information is decrypted and a procedure signal which accompanies the transmission of the encrypted information is not decrypted.]

[36. The method according to claim 31, further comprising the step of informing a transmitting side of a facsimile communication of presence of a function of decrypting the encrypted facsimile communication information, wherein the information which is sent from a transmitting side of communication in accordance with the information of the presence of the decrypting function, is decrypted and a procedure signal which accompanies the transmission of the information is not decrypted.]

[37. The method according to claim 36, wherein decrypting is not executed prior to start of communication, and the encrypted information is decrypted after it is verified that the transmission side of communication possesses an encryption function.]

[38. The method according to claim 31, further comprising generating a training-check signal in the generating step, and encrypting the training-check signal in the encrypted step, separating the encrypted information and the training-check signal and the procedure signal from the communication signal in the encrypting step, and decrypting the training-check signal in the decrypting step.]

*39. A facsimile communication apparatus comprising:*

*input means for inputting data;*

*encryption means for encrypting the inputted data;*

*transmitter means for transmitting the encrypted data;*

*determination means for determining, based on a recommended procedure signal, whether or not a data-receiving apparatus possesses any decryption function; and*

*controller means for controlling said transmitter means based on a determination result of said determination means, such that, if the data-receiving apparatus possesses a decryption function, an encrypted training signal, the data encrypted by said encryption means, and a recommended procedure end signal that is not encrypted are transmitted in sequence by said transmitter means, and, if the data-receiving apparatus does not possess a decryption function, data transmission by said transmitter means is halted and communication is terminated.*

*40. The facsimile communication apparatus according to claim 39, further comprising:*

*signal receiver means for receiving a procedure signal from the data-receiving apparatus, wherein said determination means determines whether or not the data-receiving apparatus possesses the decryption function based on the procedure signal received by said signal receiver means.*

*41. The facsimile communication apparatus according to claim 39, wherein the data is image data.*

*42. A facsimile communication method comprising the steps of:*

*inputting data;*

*encrypting the inputted data;*

*determining, based on a recommended procedure signal, whether or not a data-receiving apparatus possesses any decryption function; and*

*based on a determination result in said determining step, transmitting an encrypted training signal, the encrypted data, and a recommended procedure end signal that is not encrypted in sequence if the data-receiving apparatus possesses a decryption function, and, if the data-receiving apparatus does not possess a decryption function, halting data transmission and terminating communication.*

*43. The facsimile communication method according to claim 42, further comprising the step of receiving a procedure signal from the data-receiving apparatus, wherein said determining step determines whether or not the data-receiving apparatus possesses the decryption function based on the procedure signal received in said receiving step.*

*44. The facsimile communication method according to claim 42, wherein the data is image data.*

* * * * *